United States Patent Office 3,816,588
Patented June 11, 1974

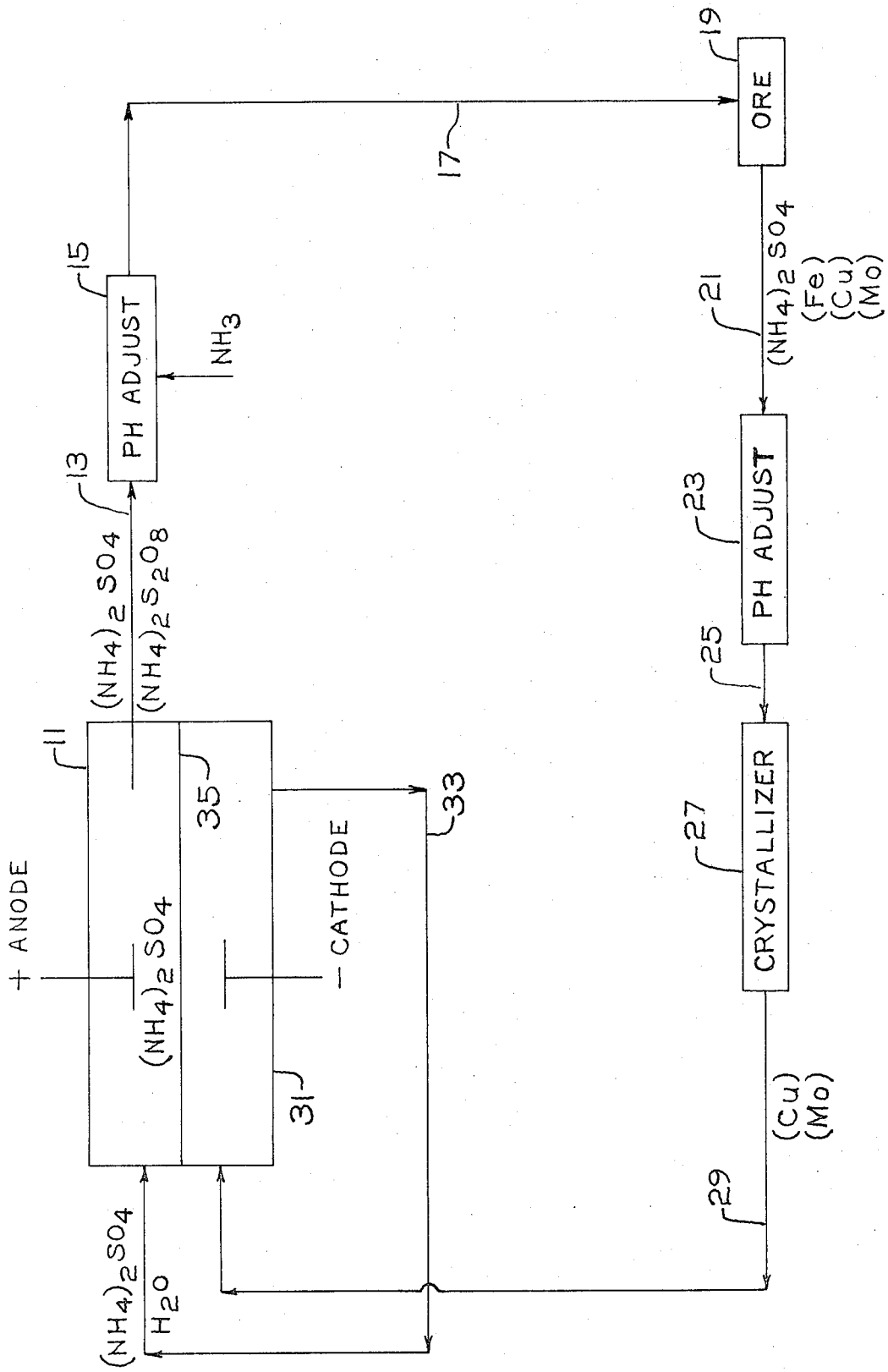

3,816,588
OPENING OF MOLYBDENITE ORES
William W. Carlin, Portland, Tex., assignor to PPG Industries, Inc., Pittsburgh, Pa.
Filed Jan. 11, 1973, Ser. No. 322,649
Int. Cl. C22b 49/00, 61/00
U.S. Cl. 423—49       12 Claims

ABSTRACT OF THE DISCLOSURE

Disclosed is a method of separating molybdenum and rhenium contained in molybdenite bearing ores. The method involves contacting the ore with a solution of ammonium or a stable alkali metal or alkaline earth metal persulfate for a period of time sufficient to solublize the molybdenum. The inability of the persulfate solution to solubilize the rhenium renders the process suitable for selective leaching of molybdenum with subsequent recovery of undissolved rhenium.

---

Molybdenum, found in the form of molybdenite, $MoS_2$, is commonly separated as the $MoS_2$ concentrate obtained from porphyry copper ores. These concentrates, which normally contain copper in the form of its sulfide and rhenium, may be relieved of their metal values by recovering the copper using hydrometallurgical techniques and subsequent roasting of the molybdenite. Since $MoS_2$ is recognized as an extremely stable species, this roasting requires extensive smelting facilities which, of course, are contributors to the pollution generally associated with the thermal processing of metal sulfides. In addition, the roasting process results in the conversion of rhenium values to volatile $Re_2O_7$ which is lost from the roasting apparatus. The use of scrubbing devices will normally recover some but not all of the $Re_2O_7$ formed so that a portion of the rhenium values originally held by the ore are lost. The use of rhenium in rhenium-platinum catalysts by the petroleum industry has resulted in its increase in price to a point where loss of even a small amount of the metal is to be avoided. A method for concentrating rhenium contained in molybdenite bearing ores so that it can be economically recovered by conventional methods would be desirable.

The present invention is a method for separating molybdenum and rhenium contained in molybdenite bearing ores thereby concentrating the rhenium. The method involves contacting the ore with ammonium or a stable alkali metal or alkaline earth metal persulfate for a time sufficient to solubilize at least part of the molybdenum.

It has now been discovered that the molybdenum in molybdenite bearing ores can be solubilized in persulfate solution. It has further been discovered that rhenium is essentially if not completely insoluble in such solutions. The discovery that persulfate solutions possess such selective solubility for molybdenum and rhenium provides a convenient method for their separation. The ore containing both metals is contacted with a persulfate solution for a time sufficient to solubilize some or all of the molybdenum leaving the insoluble rhenium behind as a solid. The concentrated rhenium may be economically recovered. One method of such recovery is to oxidize the rhenium in $H_2SO_4$ with permanganate or perchloric acid to form $Re_2O_7$ which can be distilled from the solution. An alternative method of recovery is to solubilize the rhenium with a hypochlorite and recover it by its electrodeposition.

It has further been discovered that copper is substantially more readily soluble in persulfate solution than is molybdenum. Thus, when those ores containing copper, molybdenum and rhenium are being treated, the present invention provides a convenient separatory technique. The ore is contacted with the persulfate solution to solubilize copper until molybdenum is detected in the leach liquor. At this point, the leach liquor is removed from the leaching chamber and the ore is releached to solubilize the molybdenum. When it is desired only to solubilize copper and molybdenum in order to effectuate their removal from the rhenium values and thereby concentrate the rhenium, the releasing step is not necessary.

The persulfate ion is normally provided by ammonium persulfate; however, it may be provided by any stable alkali metal or alkaline earth metal persulfate having the requisite solubility. Barium and potassium persulfate are suitable. The persulfate leaching is normally carried out with a persulfate solution having a concentration of from 10 to 500 grams per liter of the persulfate, preferably ammonium persulfate, and at a temperature of from 20° C. to 110° C., preferably from 25° C. to 40° C. The preferred temperature range is selected to optimize the balance between slow reaction rates at lower temperatures and persulfate decomposition at higher temperatures.

Since copper is more readily solubilized than molybdenum, the persulfate concentrations and reaction temperatures will normally be lower when copper is being solubilized than will be the case when the object is to solubilize molybdenum. For example, a solution having an ammonium persulfate concentration of 5 to 50 grams per liter and a temperature of from 30° to 50° C. may be used to solubilize copper and a solution containing 50 to 100 grams per liter ammonium persulfate and a temperature of from 50° to 110° C. used during the releach to solubilize molybdenum. These ranges of ammonium persulfate concentration and leaching temperature are preferred for most efficient separation of copper and molybdenum.

The ore or ore concentrate is normally ground to a particle size of $-100 +325$ mesh with a particle size of less than 200 mesh on the U.S. Sieve Series being typical. The persulfate solution is normally employed in sufficient quantity to provide a slurry containing 5 to 60 percent solids by weight with a slurry containing 10 to 20 percent solids being preferred.

Leach time will vary depending on such variables as particle size of the ore, persulfate concentration and temperature. The degree of solubilization desired will also have an effect on the leach time. Substantially complete solubilization of copper can normally be achieved in a period of from 3 to 5 days in the preferred ranges of temperature and persulfate concentration. A leach time of from 2 to 8 days will normally be required to solubilize substantially all of the molybdenum.

The generation of $(NH_4)_2S_2O_8$ for leaching of the ore may be carried out in an electrolytic cell as illustrated by the drawing. In operation, the $(NH_4)_2SO_4$ solution in the anode compartment of the cell 11 is oxidized to $(NH_4)_2S_2O_8$. In order to produce an economically attractive amount of the persulfate, the ammonium sulfate concentration should be in the range of from 100 to 800 grams per liter with a concentration of 300 to 500 grams per liter being preferred and the potential between the electrodes should be at least 3.5 volts with a potential of 4.5 to 6.0 volts being preferred. The $(NH_4)_2S_2O_8$ produced in the anode compartment along with some unreacted $(NH_4)_2SO_4$ is removed through line 13 to compartment 15 where the pH is adjusted to a level of 7 to 14 and preferably to a level of from 9 to 11. A pH in the range of from 9 to 11 is preferred for an optimum balance of leaching rate-vs.-ammonium persulfate decomposition rate. After adjustment of the pH, the ammonium persulfate solution is fed via line 17 to the ore contained in leaching chamber 19. The ammonium persulfate solution is allowed to remain in contact with the ore for a period sufficient to solubilize the desired amount of metal.

After the leaching of a typical ore concentrate, which comprises 90 percent $MoS_2$, 5 percent $CuFeS_2$, 3 percent $H_2O$, 0.2 percent Re and the remainder acid insolubles, the solution, which is essentially ammonium sulfate containing solubilized metal species of copper, molybdenum and iron, is removed from the leaching chamber via line 21 leaving a rhenium concentrate behind. The rhenium concentrate is then recovered from the leaching chamber. When iron is among the solubilized metal species, the pH is adjusted by addition of ammonia to the leach liquor in compartment 23 to a level of from 8 to 9 and the solution passed via line 25 to a crystalizer 27 where the solution is concentrated and cooled to precipitate iron as $(NH_4)_2SO_4 \cdot FeSO_4$. The $(NH_4)_2SO_4$ solution containing soluble copper and molybdenum is passed through line 29 to the cathode compartment of the cell 31. In the cathode compartment, the solubilized metal species are reduced to their respective free metals and plated on the cathode. By application of a controlled potential copper and molybdenum can be separated by sequential deposition. Of course, when separation of these two metals is achieved in the leaching chamber such as by interrupting the leaching of copper when molybdenum is detected in the leach liquor, application of a controlled potential is not necessary. Since the separation of copper and molybdenum in the leaching operation will not normally be 100 percent effective, both separatory techniques may be employed to provide effective separation.

After plating of the solubilized species of copper and molybdenum, the solution in the cathode will consist essentially of $(NH_4)_2SO_4$ and water. This solution is removed from the cathode compartment via line 33 and introduced to the anode compartment as the source of additional $(NH_4)_2SO_4$ for oxidation to $(NH_4)_2S_2O_8$. The anode and cathode compartments are separated by a diaphragm 35. This diaphragm is preferably a cation permeable diaphragm so that free metal cations or hydronium ions generated in the cathode compartment and carried to the anode compartment through line 33 can percolate through the diaphragm back to the cathode compartment.

The use of an electrolytic cell to both generate persulfate and plate the solubilized metal improves the economics of the metal recovery operation. Other metals whose sulfides are solubilized by persulfate solutions may be recovered in this manner. Examples of such metals include silver, lead, zinc, nickel, cobalt and cadmium.

The invention is further illustrated by the following example.

EXAMPLE 1

A sample of particulate (200 mesh) molybdenite ore concentrate was used in the following experiment. The sample had a reported assay of 1.1 percent copper, 1.9 percent iron, 90 percent molybdenum (as molybdenum disulfide), 0.125 percent rhenium, 5 percent water and 2 percent acid insolubles.

A 10 gram sample of ore concentrate was prepared for each leaching study and contacted with 100 milliliters of an ammonium persulfate solution prepared by dissolving regent grade $(NH_4)_2S_2O_8$ in distilled water to the desired concentration. The ore samples were maintained in contact with the solution for periods of from 1 hour to 8 days. The amount of each metal solubilized was determined by analyzing the leach liquor, after it had been separated from the ore by filtration, using X-ray fluorescence procedures. The results presented were obtained by determining the concentration of the metals in the leach liquor, measuring the volume and specific gravity of the leach liquor, calculating the weight of the metals solubilized and calculating the percent of the metals solubilized on the basis of the metals in the concentrate. To determine if rhenium was being solubilized from the molybdenite ore, the leach liquor was concentrated fourfold and submitted for X-ray fluorescence analysis. The limit of detection of rhenium by this procedure was 25 parts per million. No rhenium was detected in any solution indicating that less than 5 percent was dissolved from the ore.

The results of leaching molybdenite concentrates with ammonium persulfate are set out in Table 1.

TABLE 1

| Run No. | Leach time | Temp., °C. | $(NH_4)_2S_2O_8$ concentration, grams/liter | Percent metal solubilized | Comments |
|---|---|---|---|---|---|
| 1 | 1 hour | 50–70 | 200 | 15.2 Cu | No Mo detected. |
| 2 | 24 hours | 23–28 | 300 | 30.3 Cu | Do. |
| 2A | 7 days | 23–28 | 300 | 12.2 Cu, 9.7 Mo | Releach of solids from Run 2. |
| 3 | 4 hours | 100 | 200 | 28.9 Cu, 1.7 Mo |  |
| 4 | 91 hours | 23–30 | 200 | 0.48 Mo | Not analyzed for Cu. |
| 5 | 8 days | 50 | 100 | 84 Cu, 0.66 Mo |  |
| 5A | 24 hours | 80 | 100 | 4.25 Mo | Releach of solids from Run 5—not analyzed for Cu. |

While the present invention has been described with respect to certain details of specific embodiments, it is not intended that the invention be construed as limited thereto except and insofar as details are set forth in the claims.

I claim:

1. A method of separating molybdenum and rhenium contained in molybdenite bearing ores which comprises contacting the ore with a solution of ammonium or a stable alkali metal or alkaline earth persulfate for a time sufficient to convert at least part of the molybdenum in the ore to a species which is soluble in the persulfate solution thereby forming a rhenium concentrate.

2. The method of claim 1 wherein the ore is contacted with an ammonium persulfate solution having a concentration of from 10 to 500 grams ammonium persulfate per liter of water.

3. The method of claim 1 wherein the ore is contacted with the persulfate solution at a temperature of from 20° to 110° C.

4. The method of claim 3 wherein the temperature is from 25° to 40° C.

5. The method of claim 1 wherein the ore contains copper in addition to molybdenum and rhenium.

6. The method of claim 5 wherein the ore is contacted with a solution containing 5 to 50 grams of ammonium persulfate per liter of water at a temperature of from 30° to 50° C. for a time sufficient to solubilize at least part of the copper.

7. The method of claim 1 wherein the ore is subsequently contacted with a solution containing 50 to 100 grams of ammonium persulfate per liter of water at a temperature of from 50° to 110° C.

8. The method of claim 1 wherein the ore has a particle size of −100 +325 on the United States Sieve Series.

9. The method of claim 1 wherein the persulfate solution is provided in an amount sufficient to provide a slurry containing 5 to 60 percent by weight of solids.

10. The method of claim 9 wherein the slurry contains 10 to 20 percent solids.

11. The method of claim 1 wherein rhenium is recovered from the rhenium concentrate.

12. The method of claim 11 wherein the rhenium is oxidized to $Re_2O_7$ in $H_2SO_4$ solution and the $Re_2O_7$ is distilled from the solution.

References Cited

UNITED STATES PATENTS

| | | | |
|---|---|---|---|
| 3,753,686 | 8/1973 | Wilder et al. | 75—121 |
| 3,576,595 | 4/1971 | Chiola et al. | 23—22 |
| 3,544,309 | 12/1970 | Fletcher et al. | 75—108 |
| 3,458,277 | 7/1969 | Platzke et al. | 423—49 |
| 3,357,821 | 12/1967 | Hendrickson | 75—103 |
| 3,307,938 | 3/1967 | Ronzio et al. | 75—121 |
| 3,241,949 | 3/1966 | Kunda et al. | 75—121 |
| 3,079,226 | 2/1963 | Newkirk | 75—121 |
| 2,978,301 | 4/1961 | Margulies et al. | 75—117 |
| 2,965,447 | 12/1960 | Zimmerley et al. | 75—117 |
| 2,876,065 | 3/1959 | Zimmerley et al. | 23—51 |

FOREIGN PATENTS

| | | | |
|---|---|---|---|
| 651,225 | 10/1962 | Canada | 75—103 |

HOWARD S. WILLIAMS, Primary Examiner

R. L. ANDREWS, Assistant Examiner

423—53; 75—103, 115, 121